United States Patent
Kinast et al.

(10) Patent No.: US 11,971,605 B2
(45) Date of Patent: Apr. 30, 2024

(54) MIRROR SUPPORT FOR A COMPOSITE OPTICAL MIRROR AND METHOD FOR ITS PRODUCTION

(71) Applicant: Fraunhofer-Gesellschaft zur Foerderung der angewandten Forschung e.V., Munich (DE)

(72) Inventors: Jan Kinast, Jena (DE); Stefan Risse, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 808 days.

(21) Appl. No.: 17/053,672

(22) PCT Filed: May 8, 2019

(86) PCT No.: PCT/EP2019/061845
§ 371 (c)(1),
(2) Date: Nov. 6, 2020

(87) PCT Pub. No.: WO2019/215243
PCT Pub. Date: Nov. 14, 2019

(65) Prior Publication Data
US 2021/0231912 A1    Jul. 29, 2021

(30) Foreign Application Priority Data

May 9, 2018 (DE) .......................... 102018111212.2

(51) Int. Cl.
G02B 7/18    (2021.01)
B33Y 70/10   (2020.01)
(Continued)

(52) U.S. Cl.
CPC ............ *G02B 7/1815* (2013.01); *B33Y 70/10* (2020.01); *B33Y 80/00* (2014.12); *G02B 1/02* (2013.01);
(Continued)

(58) Field of Classification Search
None
See application file for complete search history.

(56) References Cited

U.S. PATENT DOCUMENTS

| 4,643,543 A | 2/1987 | Mohn et al. |
| 5,045,972 A * | 9/1991 | Supan ................ H01L 23/3732 |
| | | 419/48 |

(Continued)

FOREIGN PATENT DOCUMENTS

| CN | 101263201 A | 9/2008 |
| CN | 103091743 A | 5/2013 |

(Continued)

OTHER PUBLICATIONS

Beffort, O. et al.: "Interface formation in infiltrated Al(Si)/diamond composites", Elsevier, Science Direct, Diamond and Related Materials, 2006, pp. 1250-1250.

(Continued)

*Primary Examiner* — Robert E. Tallman
(74) *Attorney, Agent, or Firm* — Slater Matsil, LLP

(57) ABSTRACT

A mirror support for an optical mirror and a method for producing an optical mirror are disclosed. In an embodiment a mirror support includes a mirror body comprising a diamond particle reinforced aluminum composite material and a polishing layer arranged on the mirror body, wherein a content of diamond particles in the aluminum composite material is between 5% by mass and 50% by mass inclusive and is selected such that a thermal coefficient of linear (Continued)

expansion of the mirror body is adapted to a thermal coefficient of linear expansion of the polishing layer.

18 Claims, 2 Drawing Sheets

(51) Int. Cl.
*B33Y 80/00* (2015.01)
*G02B 1/02* (2006.01)
*G02B 5/08* (2006.01)
*G02B 7/182* (2021.01)
*B22F 10/28* (2021.01)
*B33Y 10/00* (2015.01)

(52) U.S. Cl.
CPC ............... *G02B 5/08* (2013.01); *G02B 7/182* (2013.01); *B22F 10/28* (2021.01); *B22F 2301/052* (2013.01); *B22F 2302/406* (2013.01); *B33Y 10/00* (2014.12)

(56) References Cited

U.S. PATENT DOCUMENTS

| | | | |
|---|---|---|---|
| 6,350,176 B1 | 2/2002 | Lyons, III et al. | |
| 7,864,425 B2 | 1/2011 | Okada et al. | |
| 9,086,229 B1 | 7/2015 | Roper et al. | |
| 10,337,335 B2 | 7/2019 | Pavlov et al. | |
| 11,311,850 B2 | 4/2022 | Sundstrom et al. | |
| 2001/0014403 A1* | 8/2001 | Brown | B22F 10/28 75/235 |
| 2013/0301151 A1 | 11/2013 | Ekstein et al. | |
| 2015/0009480 A1 | 1/2015 | Shklover | |
| 2015/0017475 A1 | 1/2015 | Ward-Close | |
| 2015/0135897 A1 | 5/2015 | Sutcliffe et al. | |
| 2016/0097885 A1 | 4/2016 | Comstock, II et al. | |
| 2018/0003867 A1 | 1/2018 | Mooney et al. | |
| 2019/0093201 A1* | 3/2019 | Ishihara | C22C 21/02 |

FOREIGN PATENT DOCUMENTS

| | | |
|---|---|---|
| CN | 103540830 A | 1/2014 |
| CN | 104507601 A | 4/2015 |
| CN | 104775116 A | 7/2015 |
| CN | 107949551 A | 4/2018 |
| DE | 102005026418 B4 | 5/2008 |
| DE | 102011002953 A1 | 7/2012 |
| DE | 102013204115 A1 | 3/2014 |
| DE | 202013010638 U1 | 5/2014 |
| DE | 102013107192 A1 | 1/2015 |
| EP | 2065734 A1 | 6/2009 |
| JP | H09157773 A | 6/1997 |
| JP | 2015516299 A | 6/2015 |
| WO | 2004077114 A1 | 9/2004 |
| WO | 2013017144 A1 | 2/2013 |
| WO | 2015074677 A1 | 5/2015 |
| WO | 2015183619 A2 | 12/2015 |
| WO | 2016170043 A1 | 10/2016 |

OTHER PUBLICATIONS

Kinast, J. et al.: "Minimizing the bimetallic bending for cryogenic metal optics based on electroless nickel," Proceedings of SPIE, SPIEDigitalLibrary.org/conference-proceedings-of-spie, Jul. 18, 2014, 10 pages, Quebec, Canada.
Ruch, P. W. et al.: "Selective interfacial bonding in Al(Si)-diamond composites and its effect on thermal conductivity," Elsevier Science Direct, Composites Science and Technology 66, 2006, pp. 2677-2685.
Tan, Z. et al.: Fabrication of diamond/aluminum composites by vacuum hot pressing: Process otimization and thermal properties, Elsevier Composites: Part B 47, 2013, pp. 173-180.

* cited by examiner

MIRROR SUPPORT FOR A COMPOSITE OPTICAL MIRROR AND METHOD FOR ITS PRODUCTION

This patent application is a national phase filing under section 371 of PCT/EP2019/061845, filed May 8, 2019, which claims the priority of German patent application 102018111212.2, filed May 9, 2018, each of which is incorporated herein by reference in its entirety.

TECHNICAL FIELD

The invention concerns a mirror support made of a composite material, in particular a mirror support for an optical mirror such as a metal mirror. The invention further relates to a method for producing the mirror support.

BACKGROUND

In optical measurement and signal technology, there is a strong need for mirrors with complex surfaces (e.g. free-form optics, aspheres), on which high demands are made in terms of the accuracy of the shaping. At the same time, the mirrors should be characterized by low weight and high stiffness. A mirror typically comprises a mirror support with the desired surface on which one or more reflection layers are arranged. The at least one reflection layer is preferably applied by physical vapor deposition, for example by sputtering, vapor deposition, ion-assisted coating or atomic layer deposition.

Mirror supports made of e.g. aluminum, copper or brass are machined e.g. with a diamond tool until the desired surface shape is achieved. Well-known methods of ultra-precision machining, such as diamond turning or milling, thus offer the possibility to produce metal optics with e.g. spherical, aspherical or free-form surfaces with form deviations (PV)<200 nm at a component diameter of 100 mm and roughness (RMS) in the range of 2 nm to 5 nm. By using machining, the achievable roughness and surface shape deviation is limited to values that may be sufficient for applications in the spectral infrared range, but are insufficient for shorter wavelengths.

It is known that the roughness and surface shape deviation can be reduced by fine or corrective polishing. For this purpose, mirror supports with a mirror body, e.g. made of aluminum with a polishing layer, e.g. made of an amorphous nickel-phosphorus alloy, are used, which are subjected to polishing.

The materials of the mirror body and the polishing layer are selected with reference to different thermal, mechanical or production requirements. While the mirror body, especially for movable optical mirrors, should be light and yet dimensionally stable, the polishing layer must be polishable and inert to the ambient conditions (oxygen, humidity). For this reason, the mirror body and the polishing layer are usually made of different materials.

A disadvantage of combining different materials is that there can be considerable differences in the coefficients of thermal linear expansion. For example, the thermal expansion coefficient of the aluminum alloy Al6061 (see e.g. WO 2004/077114 A1, U.S. Pat. No. 6,350,176 Bi), which is commonly used as substrate body, is $23.8*10^{-6}/K$, while a NiP polishing layer typically comprises a thermal expansion coefficient of $13.5*10^{-6}/K$.

When optical mirrors with such a mirror support are subjected to thermal cycling during use, the different coefficients of thermal expansion cause deformation or stress, as in a bimetallic element, which can significantly impair the optical function and may even lead to functional failure.

Due to the mechanical demands on the mirror bodies, only a few materials are available for mirror supports so far. In addition to the aluminum alloy Al6061 mentioned above, these include other aluminum alloys as well as beryllium and beryllium alloys. The use of beryllium can be problematic because beryllium oxides are toxic and the raw material is very expensive. In practice, in order to avoid the above-mentioned mismatch of the coefficients of thermal linear expansion, attempts have so far been made to produce the polishing layer from a material whose coefficient of thermal linear expansion is matched to the thermal expansion of the mirror body. The disadvantage of this concept is that experience gained in polishing the materials commonly used for polishing layers, such as NiP, cannot be easily transferred to polishing other materials. Furthermore, the polishing layer must be compatible with the materials of the reflection layers deposited on them.

German Patent No. 10 2005 026 418 B4 describes an aluminum composite material with silicon particles which, coated with an amorphous NiP polishing layer, is used for optical elements.

SUMMARY

Embodiments provide an improved mirror support, which comprises in particular an improved dimensional and temperature stability, a sufficiently low mass density for the applications of moving mirrors and a high mechanical stability. Further embodiments provide a suitable method for producing the mirror support.

According to at least one embodiment, the mirror support comprises a mirror body and a polishing layer. The mirror body comprises a diamond particle reinforced aluminum composite material, wherein the aluminum composite material comprises a predetermined content of diamond particles. The content of diamond particles is advantageously between 5% by mass and 50% by mass, whereby the "content of diamond particles" here and in the following means the mass fraction of diamond particles in the aluminum composite material. The diamond particles are diamond particles of natural or synthetic origin. In particular, the diamond particles comprise polycrystalline structures (PCD, Polycrystalline Diamond). This distinguishes the diamond particles especially from diamond-like carbon. The diamond particles comprise sizes from 1 μm to 100 μm, preferably 20 μm to 50 μm. The shape of the diamond particles is polygonal, rotationally ellipsoidal, sharp-edged or preferably spheroidal.

The diamond particles contained in the aluminum composite material provide a high value of elasticity modulus and thermal conductivity, which is advantageous for lightweight applications as well as for setting a high shape accuracy. On the mirror body a polishing layer is arranged, which comprises e.g. PVD-SiC, PVD-Si, CVD-Si, PECVD-$Si_2$, PECVD-$Si_3N_4$, PVD-$ZrO_2$ or preferably NiP.

The use of the diamond particle reinforced aluminum composite material as material for the mirror body has the particular advantage that a high thermal conductivity and a high stiffness are achieved. On the other hand, diamond particle reinforced aluminum composite materials have mechanical properties that do not allow the production of a mirror body per se. In particular, the comparatively high hardness and the brittle properties of this material do not easily allow mechanical processing by material-removing methods such as milling or drilling. Embodiments make particular use of the idea of producing the mirror body from the diamond particle reinforced aluminum composite material by additive manufacturing. This manufacturing process makes it advantageously possible to produce a monolithic mirror body from the diamond particle reinforced aluminum composite material, which would not be readily possible with conventional methods. The additive manufacturing process thus makes it possible to make the material itself, which is not readily available for mirror bodies due to its properties that make its manufacture considerably more difficult, accessible for this application in order to benefit from the advantages of the material such as hardness and thermal properties.

The content of diamond particles in the diamond particle reinforced aluminum composite material is dimensioned in such a way that an adaptation of the thermal linear expansion coefficient of the mirror body to the thermal linear expansion coefficient of the polishing layer is achieved. The term "adaptation" is used here to denote such an approximation of the thermal coefficients of linear expansion that the difference between the thermal coefficients of linear expansion of the mirror body and the polishing layer is less than $2.5*10^{-6}/K$, preferably less than $1*10^{-6}/K$. Particularly preferred are embodiments in which the coefficients of thermal linear expansion of the mirror body and the polishing layer are substantially equal, so that they comprise a difference of less than $0.5*10^{-6}/K$ in particular.

The adaptation of the coefficient of thermal linear expansion of the mirror body to the coefficient of thermal linear expansion of the polishing layer has the advantage that the mirror support resists high thermal loads, especially thermal gradient loads.

According to a preferred embodiment, the mirror body consists of a diamond particle reinforced aluminum composite material with such a content of diamond particles that the coefficient of linear thermal expansion in the temperature range from −180° C. to +100° C., preferably in the range from −40° C. to +60° C., is in the range from $10*10^{-6}/K$ to $16*10^{-6}/K$. With such a mirror body, a particularly good adaptation to typically used materials of polishing layers is achieved.

The content of diamond particles in the aluminum composite material is in particular between 5% by mass and 50% by mass, especially preferably between 10% by mass and 20% by mass. A content of diamond particles in this range allows on the one hand the adjustment of the coefficient of thermal linear expansion to that of the polishing layer. In addition, the thermal conductivity, the heat capacity and the mechanical stiffness can be improved by the content of diamond particles.

A variation of the content of diamond particles allows the aluminum composite material to be adapted to different possible materials of the polishing layer. Especially preferred is an embodiment in which the polishing layer is made of a nickel-phosphorus alloy, which has an advantageous coefficient of linear thermal expansion from $11*10^{-6}/K$ up to $14*10^{-6}/K$. The use of a NiP polishing layer has the special advantage that there is a lot of experience in polishing this material. The mirror support can therefore be subjected to the same polishing procedures as are known from conventional mirror supports.

In a preferred configuration, the polishing layer comprises an RMS roughness of less than 5 nm. In this way, in particular a high reflectivity is obtained. If the mirror support comprises a polishing layer with an RMS roughness of less than or equal to 1 nm, there are further advantages for using a mirror equipped with the mirror support for wavelengths in the visible spectral range or shorter wavelengths.

The mirror support is used in particular to produce a mirror, especially an optical mirror. The mirror comprises the mirror support and a reflection layer applied to it, for example a metal layer. The mirror layer can comprise several sub-layers, for example metal layers and/or dielectric layers.

In the method for manufacturing the mirror support according to embodiments, a mirror body comprising a diamond particle reinforced aluminum composite material is produced by additive manufacturing and subsequently a polishing layer is applied to the mirror body, the content of diamond particles in the aluminum composite material being between 5% by mass and 50% by mass, in particular between 10% by mass and 30% by mass, and being selected such that the coefficient of thermal linear expansion of the mirror body is adapted to the coefficient of thermal linear expansion of the polishing layer.

As mentioned above, additive manufacturing enables the production of a monolithic mirror body from the aluminum composite material with a diamond particle content in the range of 5% by mass to 50% by mass, although this material is difficult to machine due to its hardness and brittle properties. In the additive manufacturing process, it is advantageous not to use any material-removing methods. Instead, the mirror body is produced in layers close to the final contour, e.g. by selective laser melting, especially on the basis of a CAD model.

In case of a preferred design, the additive manufacturing is done by selective laser melting. In selective laser melting, the diamond particle reinforced aluminum composite material in powder form is applied layer by layer with a squeegee and completely remelted locally into solid material by means of laser radiation. Afterwards a new layer of powder is applied and remelted by laser radiation. This cycle is repeated until the entire mirror body is made of a multitude of locally remelted powder layers.

When manufacturing the mirror body by additive manufacturing, especially selective laser melting, lightweight structures, cooling structures and/or supporting structures can be integrated into the mirror body without any additional manufacturing step. Integrated cooling structures can be provided for liquid or gaseous media.

According to a preferred embodiment, the mirror support, i.e. the composite of the mirror body and the polishing layer, is subjected to a thermal treatment. In this way, a dimensional stabilization of the material pairing of the mirror body and the polishing layer can be advantageously achieved. The thermal treatment is preferably carried out in a temperature range from 150° C. to 200° C. During the thermal treatment in this temperature range, any residual stresses still present can be largely eliminated, so that the mirror produced with the mirror support comprises high stability and reproducibility of the optical properties. The thermal treatment is preferably followed by polishing of the polishing layer to produce the desired shape of the mirror support with a minimized roughness.

BRIEF DESCRIPTION OF THE DRAWINGS

The advantageous designs described for the mirror support also apply to the method and vice versa.

Further details and advantages of the invention can be seen in the following description of FIGS. 1 and 2.

In the Figures:

FIG. 1A shows a schematic sectional view of a mirror with the mirror support according to a first exemplary embodiment;

FIG. 1B shows a section of the mirror with the mirror support according to the first exemplary embodiment; and FIG. 2 shows a schematic view of a mirror with the mirror support according to another exemplary embodiment.

DETAILED DESCRIPTION OF ILLUSTRATIVE EMBODIMENTS

Figure 1A:
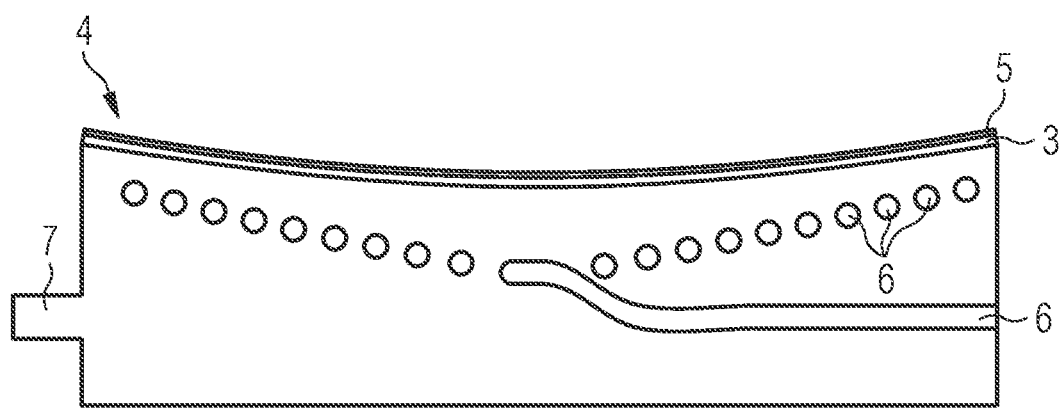
Figure 1B:
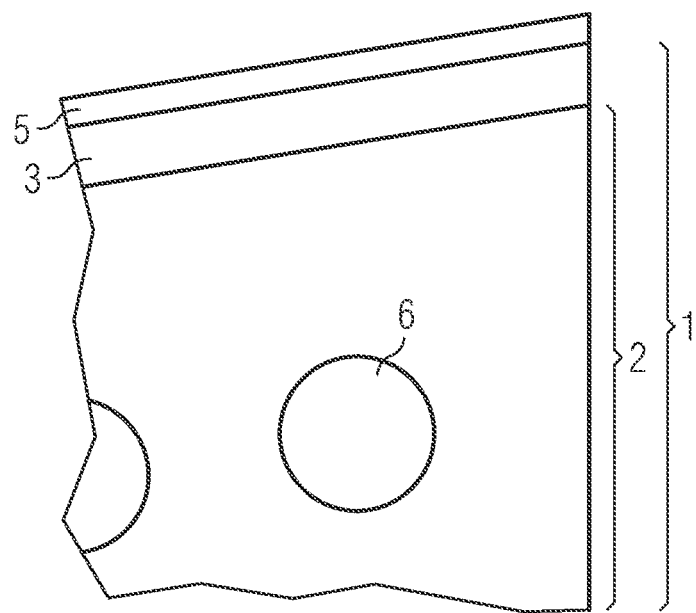

The optical mirror 4 according to the exemplary embodiment of FIGS. 1A and 1B comprises a mirror support 1 and a reflection layer 5. The mirror support 1 comprises a mirror body 2 and a polishing layer 3, which comprises a NiP alloy. The optical mirror 4 of FIG. 2 comprises an internal cooling structure 6 and a support structure 7.

In the exemplary embodiment, mirror 4 is an optical mirror with a spherical surface. The implementation of the embodiments is not limited to this mirror form, but is also possible with plane or aspherically curved mirrors or freeform mirrors. The additive manufacturing of the mirror support suggested herein is particularly advantageous for producing the mirror support with a spherically or aspherically curved form or a freeform, since this is very difficult to achieve with conventional manufacturing methods (e.g. casting) due to the mechanical properties of the diamond particle reinforced aluminum composite material. In addition, additive manufacturing allows to reduce the mass of the mirror support, for example by creating recesses or cavities with very thin walls, e.g. 0.1 mm to 1 mm, in the mirror support, which cannot be easily realized with conventional manufacturing processes.

The mirror body 2 consists of a diamond particle reinforced aluminum composite material with a diamond particle content that causes a coefficient of linear thermal expansion adapted to the NiP polishing layer. The polishing layer 3 consists of a chemically or galvanically produced amorphous nickel-phosphorus alloy with a phosphorus concentration of 10% by mass to 15% by mass (preferably >10.5% by mass, e.g. 12% by mass) and comprises a thickness of about 10 μm to 2000 μm.

The mirror 4, for example, is produced as follows. First, the mirror body 2 is produced from a diamond particle reinforced aluminum composite material by additive manufacturing (preferably selective laser melting). A homogeneous powder mixture consisting of Al6061 and diamond powder is used. The concrete selection of the content of diamond particles is based on the available material data of the composite material used.

When using a polishing layer, e.g. PVD-SiC, PVD-Si, CVD-Si, PECVD-SiO$_2$, PECVD-Si$_3$N$_4$, PVD-ZrO$_2$ or preferably chemically produced NiP, with a layer thickness of <200 μm, a surface of the blank is machined. The blank can be machined ultra-precisely with conventional carbide tools or diamond tools (e.g. PCD tools made of polycrystalline diamond). Since the composite materials used according to embodiments comprise a high proportion of brittle-hard inclusions compared to conventional mirror bodies and are therefore relatively brittle, low cutting depths and low feed rates are preferred for machining.

By using a polishing layer, e.g. galvanically produced NiP, with a layer thickness of >200 μm, a machining reworking of the blank can be avoided.

Subsequently, a thermal treatment can be carried out to reduce the stresses introduced. The thermal treatment is preferably carried out for a period of 6 h at 350° C.

In a further step, the polishing layer 3 is deposited. The deposition of the polishing layer 3 can be achieved in particular by an electroplating or electrochemical process. The deposition preferably includes electroless nickel plating. For this purpose, the surface of the mirror body 2 is first cleaned, activated and then subjected to deposition. After the polishing layer 3 has been applied, a further thermal treatment follows, for example for 6 h at 150° C., in order to reduce layer stresses in the material compound of the mirror support 1. Subsequently, a final polishing can be carried out, producing an RMS surface roughness of less than 5 nm, preferably less than 1 nm.

To produce a mirror 4 with the mirror support 1, a reflection layer 5 is deposited on the polishing layer 3 in a further step, preferably by physical vapor deposition. The reflection layer 5 can be a single layer or comprise several partial layers. The reflection layer 5 can be a metal layer, for example. Alternatively, the reflection layer 5 can be a multilayer system, for example a dielectric interference layer system or a combination of one or more metal layers with one or more dielectric layers.

Figure 2:
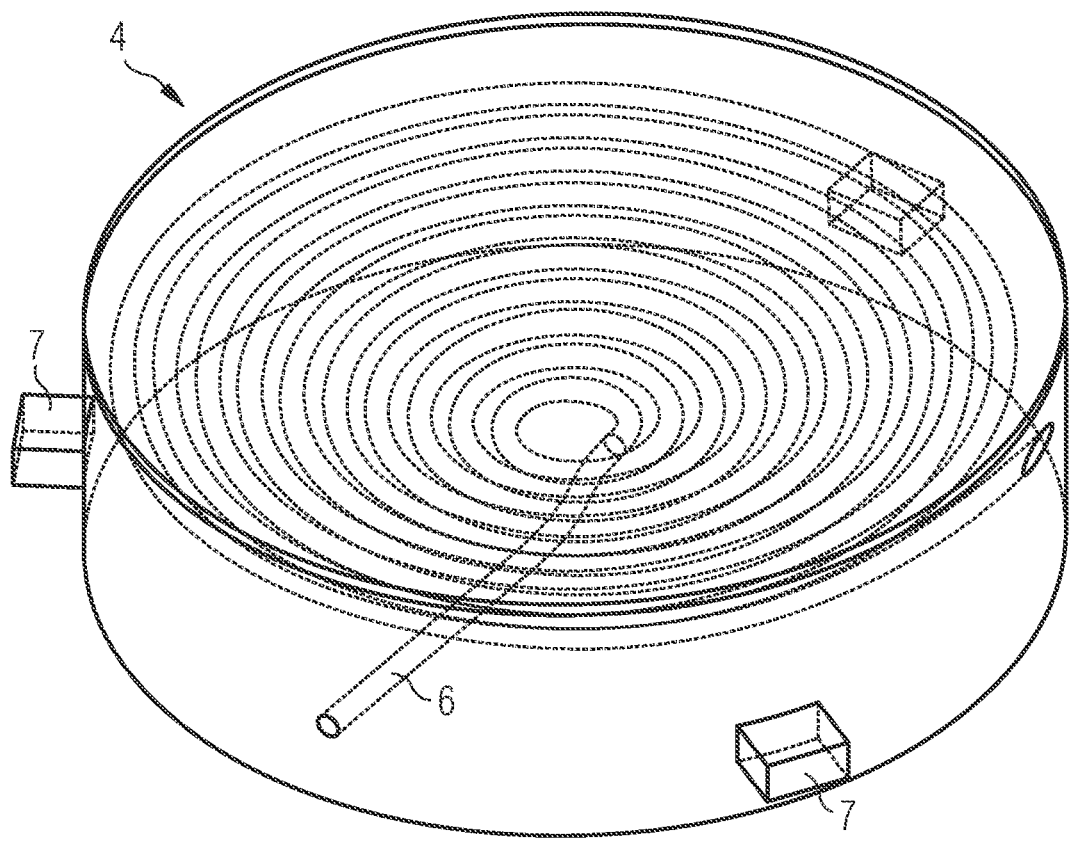

FIG. 2 illustrates another exemplary embodiment of an optical mirror 4. The optical mirror comprises an internal cooling structure 6 and a supporting structure 7. Further designs of the mirror 4 and the mirror support contained therein as well as the method of its manufacture may correspond to the first exemplary embodiment and are therefore not explained again.

The features of the invention disclosed in the above description, the drawings and the claims may be of importance for the realization of the invention in various forms, either individually or in combination.

The invention claimed is:

1. A mirror support comprising:
   a mirror body comprising a diamond particle reinforced aluminum composite material; and
   a polishing layer arranged on the mirror body,
   wherein a content of diamond particles in the aluminum composite material is between 5% by mass and 50% by mass, inclusive, and is selected such that a thermal coefficient of linear expansion of the mirror body is adapted to a thermal coefficient of linear expansion of the polishing layer,
   wherein the mirror body is a monolithic mirror body produced by additive manufacturing, and
   wherein at least one of a cooling structure or a lightweight structure is integrated into the mirror body.

2. The mirror support according to claim 1, wherein the content of diamond particles in the aluminum composite material is selected such that the thermal coefficient of linear expansion of the mirror body at temperatures of −180° C. to 100° C. is in a range of $3*10^{-6}$/K to $20*10^{-6}$/K.

3. The mirror support according to claim 1, wherein the content of diamond particles in the aluminum composite material is between 10% by mass and 20% by mass inclusive.

4. The mirror support according to claim 1, wherein the polishing layer comprises NiP, SiC, Si, SiO$_2$, Si$_3$N$_4$, or ZrO$_2$.

5. The mirror support according to claim 1, wherein the polishing layer comprises a surface with an RMS roughness of at most 5 nm.

6. A mirror comprising:
   the mirror support according to claim 1; and
   at least one reflection layer arranged on the polishing layer.

7. A method for producing a mirror support, the method comprising:
producing, by additive manufacturing, a mirror body comprising a diamond particle reinforced aluminum composite material; and
applying a polishing layer on the mirror body,
wherein a content of diamond particles in the aluminum composite material is between 5% by mass and 50% by mass inclusive and is selected such that a thermal coefficient of linear expansion of the mirror body is adapted to a thermal coefficient of linear expansion of the polishing layer.

8. The method according to claim 7, wherein the additive manufacturing comprises selective laser melting.

9. The method according to claim 7, further comprising integrating, by the additive manufacturing, a supporting structure and/or a cooling structure into the mirror body.

10. The method according to claim 7, further comprising thermally treating the composite material of the mirror body and the polishing layer at a temperature in a range of 130° C. to 200° C.

11. The method according to claim 7, further comprising polishing a surface of the polishing layer so that it comprises an RMS roughness value of less than 5 nm.

12. A mirror support comprising:
a mirror body comprising a diamond particle reinforced aluminum composite material; and
a polishing layer arranged on the mirror body,
wherein a content of diamond particles in the aluminum composite material is between 5% by mass and 50% by mass, inclusive, and is selected such that a thermal coefficient of linear expansion of the mirror body is adapted to a thermal coefficient of linear expansion of the polishing layer,
wherein the polishing layer comprises NiP, SiC, Si, $SiO_2$, $Si_3N_4$, or $ZrO_2$.

13. The mirror support according to claim 12, wherein the content of diamond particles in the aluminum composite material is selected such that the thermal coefficient of linear expansion of the mirror body at temperatures of $-180°$ C. to $100°$ C. is in a range of $3*10^{-6}$/K to $20*10^{-6}$/K.

14. The mirror support according to claim 12, wherein the content of diamond particles in the aluminum composite material is between 10% by mass and 20% by mass inclusive.

15. The mirror support according to claim 12, wherein the polishing layer comprises a surface with an RMS roughness of at most 5 nm.

16. The mirror support according to claim 12, wherein the mirror body is produced by additive manufacturing.

17. The mirror support according to claim 12, wherein a cooling structure and/or a supporting structure is integrated into the mirror body.

18. The mirror support according to claim 12, wherein a lightweight structure is integrated into the mirror body.

* * * * *